(12) United States Patent
Sugiyama

(10) Patent No.: US 7,638,987 B2
(45) Date of Patent: Dec. 29, 2009

(54) METHOD AND APPARATUS FOR POWER SUPPLYING CAPABLE OF EFFECTIVELY ELIMINATING OVERSHOOT VOLTAGE

(75) Inventor: Minoru Sugiyama, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/998,892

(22) Filed: Nov. 29, 2004

(65) Prior Publication Data

US 2005/0116692 A1    Jun. 2, 2005

(30) Foreign Application Priority Data

Dec. 2, 2003    (JP)    ............... 2003-403184

(51) Int. Cl.
  *G05F 1/10* (2006.01)
  *G05F 1/652* (2006.01)
  *G05F 1/656* (2006.01)
(52) U.S. Cl. ............... 323/222; 323/282; 323/274; 323/285; 323/286
(58) Field of Classification Search ............... 323/222, 323/282, 283, 273, 274, 285, 286
See application file for complete search history.

(56) References Cited

U.S. PATENT DOCUMENTS

| | | | | |
|---|---|---|---|---|
| 5,666,044 A | * | 9/1997 | Tuozzolo | ............... 323/277 |
| 5,995,391 A | * | 11/1999 | Davies et al. | ............... 363/43 |
| 6,114,844 A | * | 9/2000 | Chang et al. | ............... 323/281 |
| 6,806,689 B2 | * | 10/2004 | Schuellein et al. | ............... 323/272 |
| 6,826,028 B2 | * | 11/2004 | Schuellein | ............... 361/93.1 |
| 6,850,177 B2 | * | 2/2005 | Donovan et al. | ............... 341/152 |
| 6,960,947 B2 | * | 11/2005 | Albasini et al. | ............... 327/147 |
| 7,002,327 B2 | * | 2/2006 | Marino et al. | ............... 323/283 |
| 7,034,511 B2 | * | 4/2006 | Schuellein et al. | ............... 323/225 |
| 7,091,707 B2 | * | 8/2006 | Cutler | ............... 323/268 |
| 2002/0185994 A1 | * | 12/2002 | Kanouda et al. | ............... 323/282 |
| 2003/0197494 A1 | * | 10/2003 | Kanouda et al. | ............... 323/287 |
| 2004/0104715 A1 | | 6/2004 | Manabe et al. | |

FOREIGN PATENT DOCUMENTS

JP    3394915    1/2003

* cited by examiner

*Primary Examiner*—Bao Q Vu
(74) *Attorney, Agent, or Firm*—Cooper & Dunham, LLP

(57) ABSTRACT

A power supply apparatus includes a switching transistor, a transistor control circuit, and a reference voltage generator. The switching transistor performs a switching operation for converting an input source voltage to an output power voltage according to a control signal. The transistor control circuit generates the control signal based on a reference voltage and a feedback voltage associated with the output power voltage. The reference voltage generator generates the reference voltage, increases the reference voltage in a phased manner to increase the output power voltage in a phased manner to a desired value, and decreases the reference voltage to decrease the output power voltage. A power supply method is also described.

19 Claims, 4 Drawing Sheets

METHOD AND APPARATUS FOR POWER SUPPLYING CAPABLE OF EFFECTIVELY ELIMINATING OVERSHOOT VOLTAGE

BACKGROUND

1. Field

This patent specification relates to a method and apparatus for supplying power, and more particularly to a power supply method and apparatus capable of effectively eliminating an overshoot voltage occurring at a voltage change.

2. Discussion of the Background

Currently, as a power supply circuit for a power supply such as a battery included in a mobile device such as a mobile phone and a digital camera, for example, a non-isolated switching regulator having an inductor (hereinafter referred to as a switching regulator) is used because of high efficiency and smallness in size of the switching regulator.

The switching regulator, however, generates an overshoot voltage due to a circuit configuration thereof, when the switching regulator increases an output voltage. Particularly, when the switching regulator is powered up, a relatively large overshoot voltage is generated. For this reason, as shown in FIG. 1, a conventional switching regulator includes a soft-start circuit employing a method of gradually increasing the output voltage. FIG. 1 is a circuit diagram of an exemplary conventional switching regulator. The switching regulator in this case is a step-down type switching regulator configured to step down an input voltage (hereinafter referred to as a step-down switching regulator). The switching regulator may also be a step-up type switching regulator configured to step up the input voltage (hereinafter referred to as a step-up switching regulator).

The switching regulator 100 of FIG. 1 includes an input terminal IN, an output terminal OUT, a switching transistor Ma, a PWM (pulse width modulation) control circuit 101, an inductor La, a capacitor Ca, a flywheel diode Da, output voltage detecting resistors Ra and Rb, a reference voltage generation circuit 102, a capacitor Cb, a resistor Rc, a switch SW1, and a comparator CMPa. The flywheel diode is also referred to as a freewheeling diode. The switching regulator 100 is connected to a load 110.

In the switching regulator 100, an input source voltage (hereinafter referred to as an input voltage) Vin is input in the input terminal IN, and an output power voltage (hereinafter referred to as an output voltage) Vout is output from the output terminal OUT. The PWM control circuit 101 controls switching of the switching transistor Ma. The switching transistor Ma controls outputting of the input voltage Vin. The inductor La and the capacitor Ca store and discharge energy of the input voltage Vin. The output voltage detecting resistors Ra and Rb detect the output voltage Vout. The reference voltage generation circuit 102 generates and outputs a reference voltage Vref. The comparator CMPa compares the reference voltage Vref with a divided voltage Vd obtained by dividing the output voltage Vout at the output voltage detecting resistors Ra and Rb. The resistor Rc, the capacitor Cb, and the switch SW1 form a time constant circuit to gradually increase the reference voltage Vref at power-up of the switching regulator 100 for applying the reference voltage Vref to the comparator CMPa.

An exemplary soft-start circuit included in the conventional switching regulator 100 is then specifically described. The switch SW1 is turned on at power-up of the switching regulator 100. Then, the capacitor Cb is charged with the reference voltage Vref via the resistor Rc. As a result, a voltage Va at a noninverting input terminal of the comparator CMPa gradually increases, as indicated in a time chart of FIG. 2. Since the output voltage Vout from the switching regulator 100 is proportional to the reference voltage Vref, the output voltage Vout also increases gradually, as observed in the time chart. Accordingly, the overshoot voltage on power up can be prevented. Japanese Laid-Open Patent Publication No. 2000-102243 describes a power supply apparatus using a power supply control IC (integrated circuit) to gradually raise the output voltage without generating the overshoot voltage.

The conventional soft-start circuit, however, does not operate after the switching regulator 100 has been powered up. Therefore, an adverse overshoot voltage is generated when the output voltage Vout is further increased after the power-up of the switching regulator 100. Furthermore, as the output voltage Vout rapidly increases, a capacity component connected to the output terminal is rapidly charged. As a result, an excessively large amount of current is output from the power supply circuit, although a time in which the current is output is relatively short. Accordingly, there arise such problems as a noise-triggered operational error and a failure or deterioration of a device such as the load 110 and the switching transistor Ma caused by the excessively large amount of current sent to the device.

SUMMARY

This patent specification describes a novel power supply apparatus. In one example, a novel power supply apparatus includes a switching transistor, a transistor control circuit, and a reference voltage generator. The switching transistor is configured to perform a switching operation for converting an input source voltage to an output power voltage according to a control signal. The transistor control circuit is configured to generate the control signal based on a reference voltage and a feedback voltage associated with the output power voltage. The reference voltage generator is configured to generate the reference voltage, to increase the reference voltage in a phased manner to increase the output power voltage in a phased manner to a desired value, and to decrease the reference voltage to decrease the output power voltage.

This patent specification further describes another novel power supply apparatus. In one example, this power supply apparatus includes an input terminal, an output terminal, an inductor, a switching transistor, an output power voltage detection circuit, a switching control circuit, and a reference voltage generation circuit.

The input terminal is configured to receive an input source voltage. The output terminal is configured to output an output power voltage. The inductor is provided between the input terminal and the output terminal and configured to store energy of the input source voltage and discharge the energy to generate the output power voltage. The switching transistor is provided between the input terminal and the inductor and configured to control outputting of the input source voltage to the inductor by performing a switching operation according to a control signal input in the switching transistor. The output power voltage detection circuit is configured to detect the output power voltage to generate a feedback voltage proportional to the detected output power voltage. The switching control circuit is configured to control switching of the switching transistor to desirably change the output power voltage by comparing the feedback voltage with a predetermined reference voltage. The reference voltage generation circuit is configured to generate and output the reference voltage, to increase the reference voltage in a phased manner to increase the output power voltage in a phased manner to a desired value, and to decrease the reference voltage to decrease the output power voltage.

The reference voltage generation circuit may include a D/A converter configured to convert digital data into the predetermined reference voltage, and a DAC control circuit configured to output the digital data to the D/A converter to control the predetermined reference voltage to be output from the D/A converter, to change the digital data in a phased manner to increase the reference voltage in a phased manner to a desired value, and to change the digital data to decrease the reference voltage.

The DAC control circuit may have a conversion resolution that changes the reference voltage in a phased manner.

Further, the DAC control circuit may change the digital data bit-by-bit on a binary basis within the conversion resolution to increase the reference voltage in a phased manner.

The power supply apparatus may use a non-isolated switching system.

This patent specification further describes a novel power supply method. In one example, a novel method includes applying an input source voltage, providing an output terminal configured to output an output power voltage, generating a reference voltage, producing a control signal based on the reference voltage and a feedback voltage associated with the output power voltage, performing a switching operation for converting an input source voltage to the output power voltage according to the control signal, increasing the reference voltage in a phased manner to increase the output power voltage in a phased manner to a desired value, and decreasing the reference voltage to decrease the output power voltage.

This patent specification further describes another novel power supply method. In one example, this power supply method includes providing a switching transistor between an input terminal and an inductor, the input terminal receiving an input source voltage, and the inductor having one end connected to an output terminal for outputting an output power voltage to a load, detecting the output power voltage to produce a feedback voltage proportional to the detected output power voltage, generating a predetermined reference voltage, comparing the feedback voltage with the predetermined reference voltage to output a control signal to the switching transistor, performing a switching operation of the switching transistor by using the control signal, repeating an operation of storing energy of the input source voltage in the inductor and discharging the energy from the inductor to generate the output power voltage to be output, increasing the reference voltage in a phased manner to increase the output power voltage in a phased manner to a desired value, and decreasing the reference voltage to decrease the output power voltage.

The generating step may include outputting digital data, and converting the digital data to the predetermined reference voltage. The outputting step may change the digital data in a phased manner to increase the reference voltage in a phased manner to a desired value, and change the digital data to decrease the reference voltage.

Further, the outputting step may have a conversion resolution that changes the reference voltage in a phased manner.

Furthermore, the outputting step may change the digital data bit-by-bit on a binary basis within the conversion resolution to increase the reference voltage in a phased manner.

The power supply method may use a non-isolated switching system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
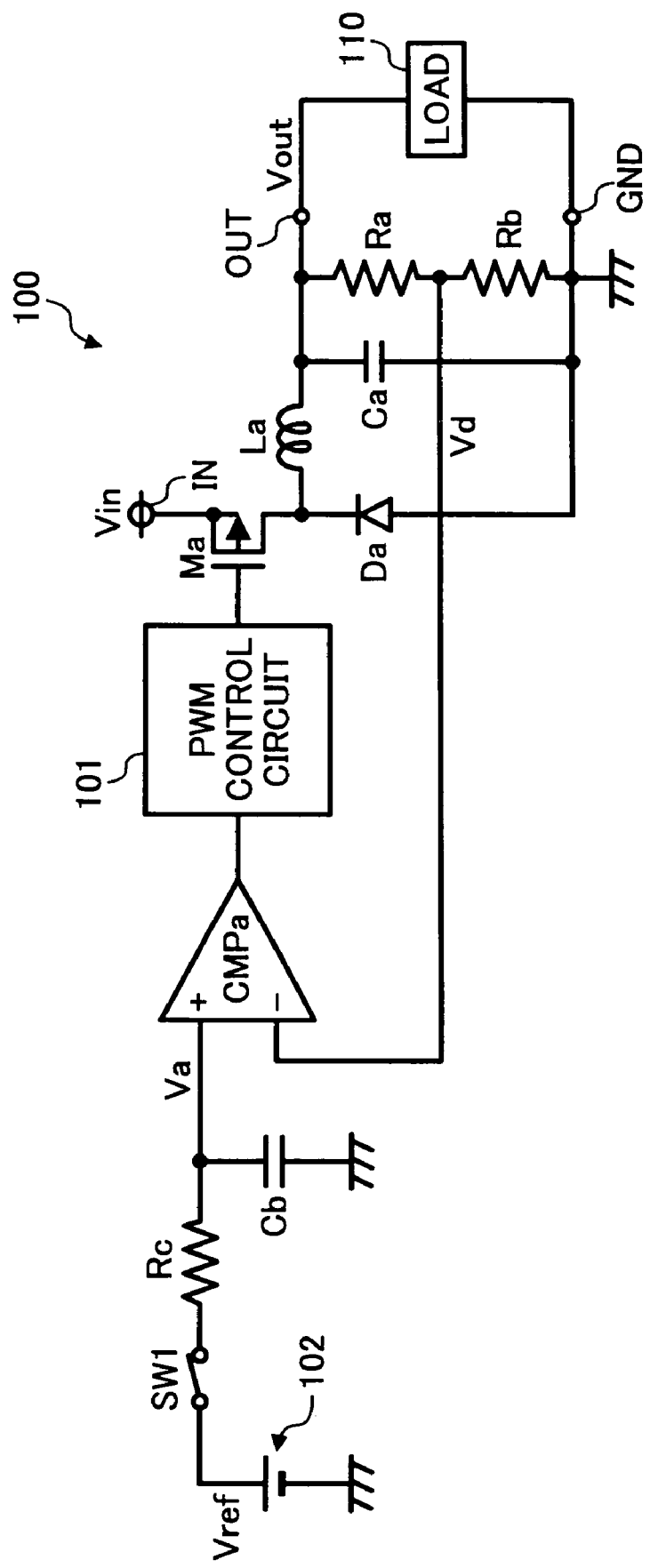
FIG. 1 is a circuit diagram illustrating an exemplary configuration of a conventional power supply circuit.
Figure 2:
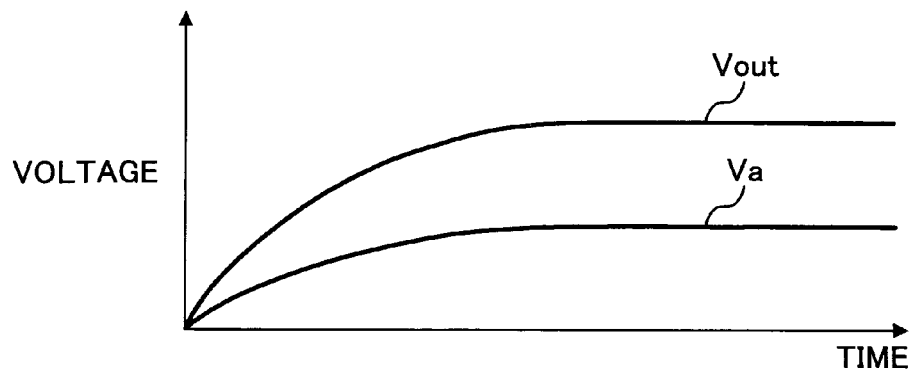
FIG. 2 is a time chart illustrating an exemplary waveform pattern of an output voltage Vout and a voltage Va shown in the circuit of FIG. 1 obtained at power-up of the circuit.
Figure 3:
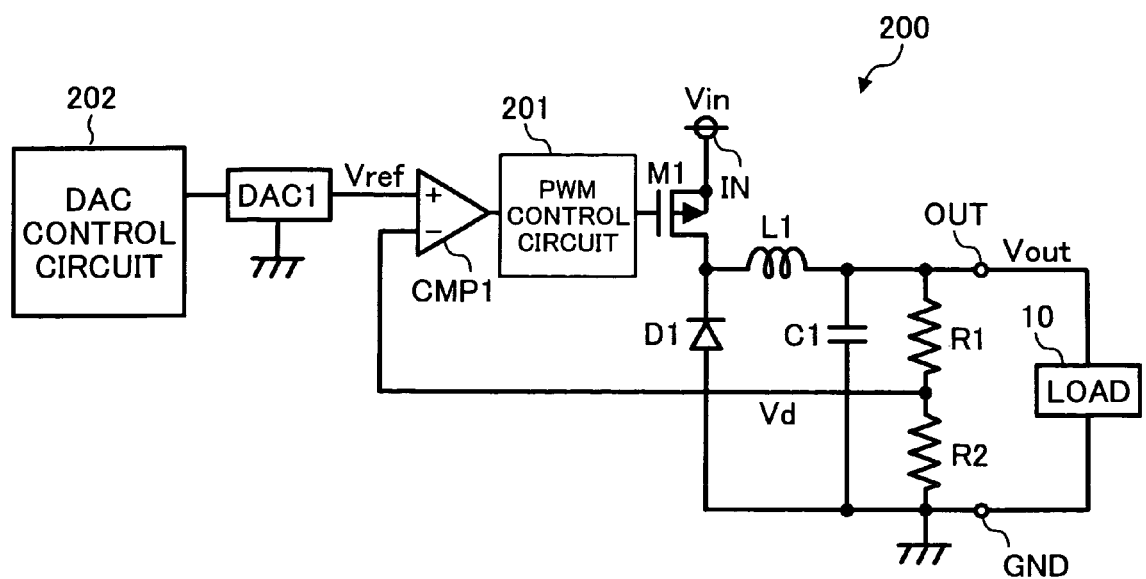
FIG. 3 is a circuit diagram illustrating a configuration of a power supply circuit according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a description is made for a power supply circuit according to a preferred embodiment of the present invention. FIG. 3 illustrates a configuration of a power supply circuit according to an exemplary embodiment of the present invention. The power supply circuit of FIG. 3 is a step-down switching regulator. The switching regulator 200 of FIG. 3 includes an input terminal IN, an output terminal OUT, a switching transistor M1, a PWM control circuit 201, an inductor L1, a capacitor C1, a flywheel diode D1, output voltage detecting resistors R1 and R2, a DAC (digital-to-analog converter) control circuit 202, a D/A (digital-to-analog) converter DAC1, and a comparator CMP1. The switching regulator 200 is connected to a load 10. In addition, the switching regulator 200 may include a soft-start circuit for suppressing an overshoot voltage occurring at power-up of the switching regulator 200.

In the switching regulator 200, an input voltage Vin is input in the input terminal IN, and an output voltage Vout is output from the output terminal OUT. M1 is formed by a PMOS (p-channel metal oxide semiconductor) transistor for controlling outputting of the input voltage Vin. The inductor L1 and the capacitor C1 store and discharge energy of the input voltage Vin. The output voltage detecting resistors R1 and R2 generate a divided voltage Vd by dividing the output voltage Vout from the output terminal OUT, and output the divided voltage Vd. The DAC control circuit 202 outputs predetermined digital data (e.g., a digital code) to the D/A converter DAC1 to control operation of the D/A converter DAC1. The D/A converter DAC1 then generates and outputs a reference voltage Vref according to the digital code input in the D/A converter DAC1. The comparator CMP1 compares the divided voltage Vd with the reference voltage Vref and outputs a voltage according to a result of the comparison. The PWM control circuit 201 controls switching of the switching transistor M1 by performing PWM (pulse width modulation) control to the switching transistor M1 according to a voltage output from the comparator CMP1.

In the switching regulator 200, the switching transistor M1 is connected in series with the inductor L1 between the input terminal IN and the output terminal OUT. A connection point of the switching transistor M1 and the inductor L1 is connected to a cathode of the diode D1. An anode of the diode D1 is connected to a ground voltage terminal GND. Between the ground voltage terminal GND and the output terminal OUT, a series circuit including the resistors R1 and R2 is connected in parallel with the capacitor C1. The resistors R1 and R2 divide the output voltage Vout to generate a divided voltage Vd, and outputs the divided voltage Vd to an inverting input terminal of the comparator CMP1. The D/A converter DAC1 generates a reference voltage Vref having a voltage value indicated by the digital code input from the DAC control circuit 202, and outputs the reference voltage Vref to a non-inverting input terminal of the comparator CMP1. Further, the load 10 is connected between the output terminal OUT and the ground voltage terminal GND.

In the switching regulator thus configured, the output voltage Vout corresponding to the reference voltage Vref output from the D/A converter DAC1 is expressed as in the following formula (1), wherein L indicates inductance of the inductor L1, Ton indicates a time during which the switching transistor M1 is activated in an ON state, and Toff indicates a time during which the switching transistor M1 is deactivated in an OFF state.

$$Vout = Vin \times Ton/(Ton+Toff) \quad (1)$$

Further, a target output voltage Vout1 to be output from the switching regulator 200 is expressed as in the following formula (2), wherein Vref indicates a reference voltage output from the D/A converter DAC1, R1 indicates resistance of the resistor R1, and R2 indicates resistance of the resistor R2.

$$Vout1 = Vref \times (R1+R2)/R2 \quad (2)$$

The PWM control circuit 201 outputs a square wave to a gate of the switching transistor M1 and controls a ratio between Ton and Toff such that the output voltage Vout from the switching regulator 200 equals to the target output voltage Vout1. The output voltage Vout from the switching regulator 200 can be changed by changing either one of the reference voltage Vref output from the D/A converter DAC1, which is a variable used in the formula (2), and the resistance of the output voltage detecting resistor R1 or R2.

In the present exemplary embodiment, the reference voltage Vref is changed to obtain the target output voltage 1. To obtain the target output voltage Vout1, the Vref needs to be changed in a phased manner, but not immediately.

Figure 4A:
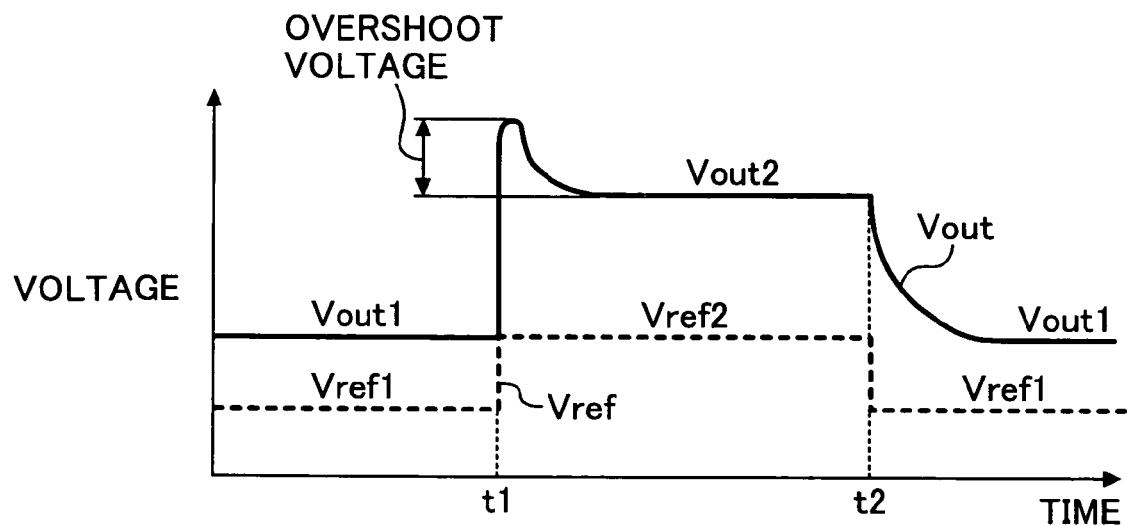
FIGS. 4A and 4B are time charts illustrating exemplary waveform patterns of the output voltage Vout obtained when a reference voltage Vref output from a D/A converter shown in the circuit of FIG. 1 is changed.
Figure 4B:
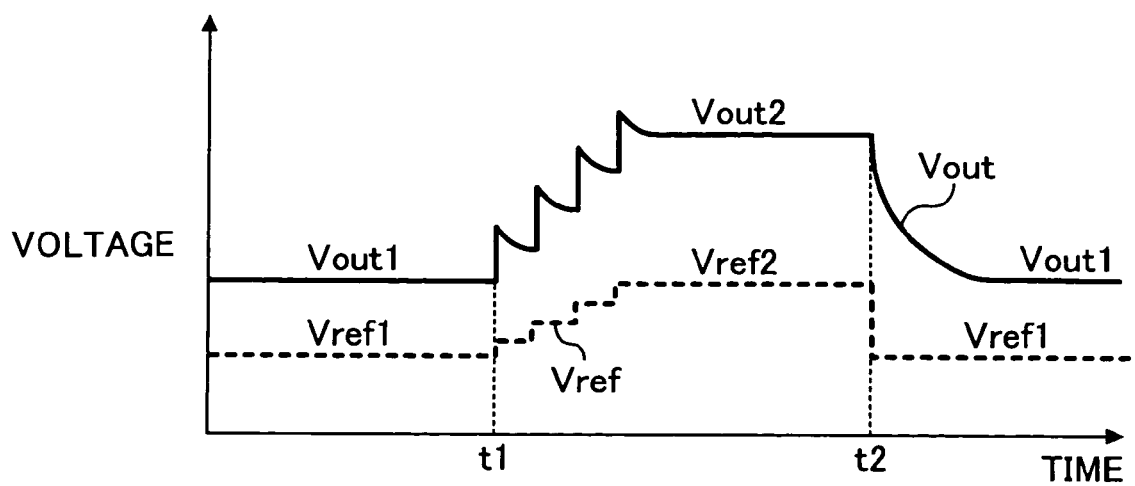

FIGS. 4A and 4B illustrate exemplary waveform patterns of the output voltage Vout obtained by changing the reference voltage Vref output from the D/A converter DAC1 of the switching regulator 200 shown in FIG. 3. Specifically, FIG. 4A illustrates an exemplary waveform pattern obtained by immediately changing the reference voltage Vref from a Vref1 to a Vref2. On the other hand, FIG. 4B illustrates an exemplary waveform pattern obtained by changing the reference voltage Vref from the Vref 1 to the Vref2 in the phased manner.

It is observed from FIG. 4A that, when the reference voltage Vref output from the D/A converter DAC1 is immediately changed from the Vref1 to the Vref2 at a time t1, the output voltage Vout from the switching regulator 200 increases from a Vout 1 to a Vout 2. In this case, the output voltage Vout exceeds the Vout 2 by a large amount, generating a relatively large overshoot voltage.

This overshoot voltage is caused by the series circuit including the switching transistor M1 and the inductor L1 connected between the input terminal IN and the output terminal OUT. In other words, when the switching transistor M1 is ON, impedance between the input terminal IN and the output terminal OUT is extremely small. Accordingly, while it is possible to rapidly increase the output voltage Vout, it takes time to control the rapidly increased output voltage Vout due to a relatively low response speed of the switching regulator 200. As a result, the relatively large overshoot voltage is generated.

In FIG. 4B, on the other hand, when the reference voltage Vref output from the D/A converter DAC1 is increased in the phased manner from the Vref1 to the Vref2 at the time t1, the output voltage Vout accordingly increases in the phased manner. As a result, the overshoot voltage generated in one phase of voltage increase can be substantially decreased, as compared with the example shown in FIG. 4A. The overshoot voltage may be decreased by a larger amount by increasing the number of phases in which the reference voltage Vref output from the D/A converter DAC1 is increased to decrease a change in the output voltage Vout per phase. The increase in the number of the phases, however, causes such inconvenience as a longer time period required for raising the output voltage Vout from the Vout1 to Vout2. Therefore, a value by which the reference voltage Vref is increased in one phase may be set to be within such a range that a resultant overshoot voltage does not adversely affect the load 10, the switching regulator 200, and so forth.

A circuit configuration of the D/A converter DAC1 can be simplified effectively by relating the value by which the reference voltage Vref is increased in one phase to a conversion resolution of the D/A converter DAC1. That is, digital data input in the DAC control circuit is changed bit-by-bit on a binary basis within the conversion resolution.

When the reference voltage Vref output from the D/A converter DAC1 is decreased from the Vref2 to the Vref1 at a time t2, on the other hand, an undershoot voltage of the output voltage Vout is not generated for the following reason. That is, when the output voltage Vout is decreased, the switching transistor M1 is in an OFF state. Further, in the present circuit configuration, the diode D1 is connected in a direction allowing no current to pass toward the output terminal OUT, i.e., a reverse-biased direction. Therefore, the impedance of the switching regulator 200 is extremely high. Accordingly, when the output voltage Vout is decreased, capacity of the load 10 and the capacitor C1 is discharged, so that the output voltage Vout is decreased at a relatively low speed, as shown in both of FIGS. 4A and 4B.

As described above, to increase the output voltage Vout, the DAC control circuit 202 changes a digital code in a phased manner and outputs the digital code to the D/A converter DAC1 so that the reference voltage Vref output from the D/A converter DAC1 is increased in the phased manner. If the value by which the output voltage Vout is increased in one phase is set to equal to or less than 100 mV, for example, the overshoot voltage can be decreased to such a level at which the overshoot voltage causes no serious problem. Further, a time during which the output voltage Vout is increased in one phase may be set to equal to or more than 30 μsec, for example. By so setting, the output voltage Vout can be increased to a predetermined value in about 1 msec, while the conventional soft-start circuit requires about 3 msec to increase the output voltage Vout to the predetermined value. To decrease the output voltage Vout, on the other hand, the DAC control circuit 202 changes and outputs the digital code to the D/A converter DAC1 so that the reference voltage Vref output from the D/A converter DAC1 is decreased to a predetermined value.

The switching regulator 200 described above is a step-down switching regulator. However, the present invention is not limited to this type of switching regulator but applicable also to a step-up switching regulator.

Figure 5:
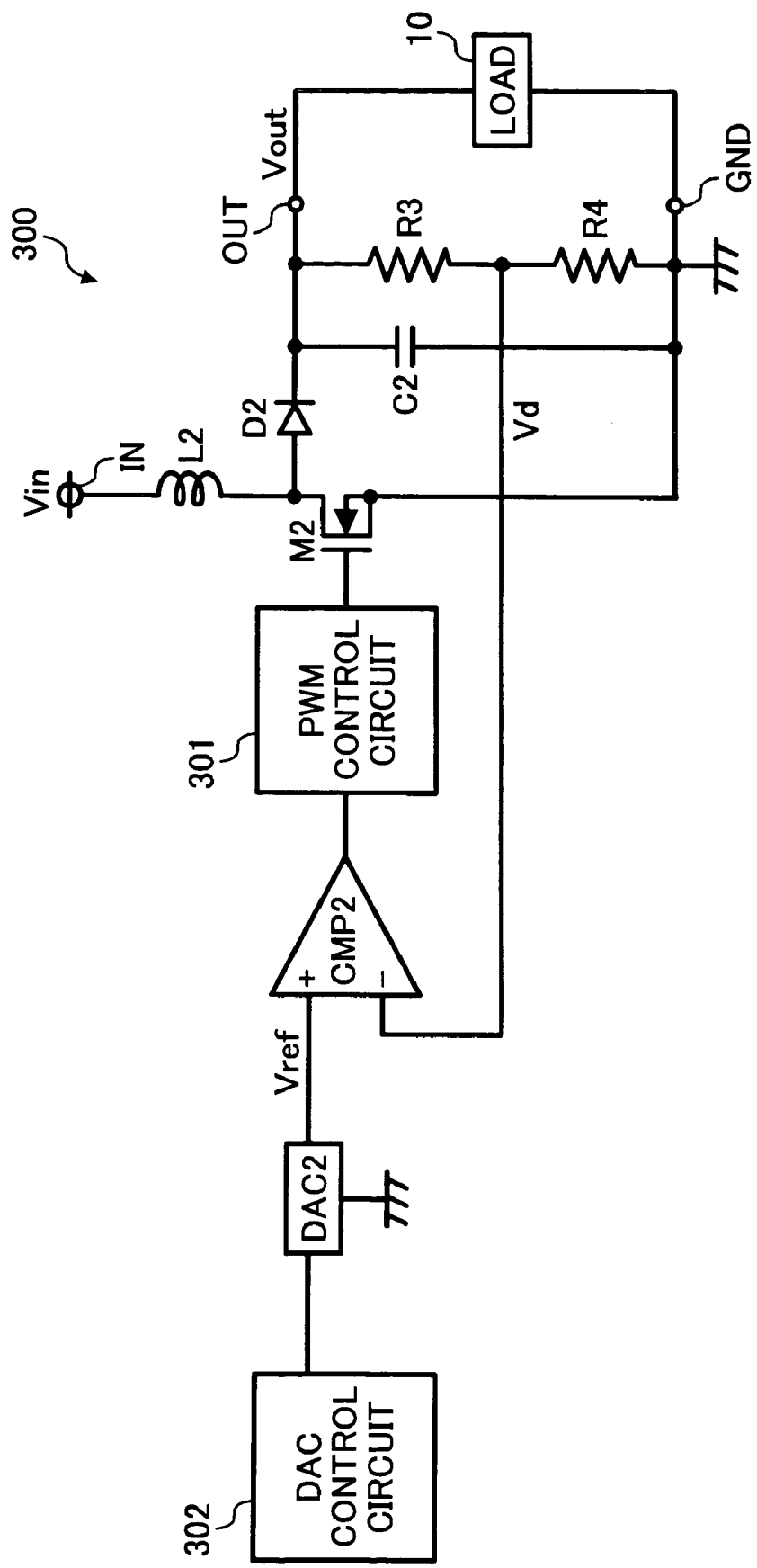
FIG. 5 is a circuit diagram illustrating a configuration of the power supply circuit according to another exemplary embodiment of the present invention.

Referring to FIG. 5, a configuration of a power supply circuit according to another exemplary embodiment of the present invention is then described. The power supply circuit shown in FIG. 5 is a step-up switching regulator. The switching regulator 300 of FIG. 5 includes an input terminal IN, an output terminal OUT, a switching transistor M2, a PWM control circuit 301, an inductor L2, a capacitor C2, a flywheel diode D2, output voltage detecting resistors R3 and R4, a DAC control circuit 302, a D/A converter DAC2, and a comparator CMP2. The switching regulator 300 is connected to a load 10. In addition, the switching regulator 300 may include a soft-start circuit for suppressing an overshoot voltage occurring at power-up of the switching regulator 300.

In the switching regulator 300, an input voltage Vin is input in the input terminal IN, and an output voltage Vout is output from the output terminal OUT. The switching transistor M2 is formed by an NMOS (n-channel metal oxide semiconductor) transistor. The output voltage detecting resistors R3 and R4 generate a divided voltage Vd by dividing an output voltage Vout output from the output terminal OUT, and output the divided voltage Vd. The DAC control circuit 302 outputs a predetermined digital code to the D/A converter DAC2 to control operation of the D/A converter DAC2. The D/A converter DAC2 then generates and outputs a reference voltage Vref according to the digital code input in the D/A converter DAC2. The comparator CMP2 compares the divided voltage Vd with the reference voltage Vref and outputs a voltage according to a result of the comparison. The PWM control circuit 301 controls switching of the switching transistor M2 by performing PWM control to the switching transistor M2 according to a voltage output from the comparator CMP2.

In the switching regulator 300, the inductor L2 is connected in series with the switching transistor M2 between the input terminal IN and a ground voltage terminal GND, and the diode D2 is connected between the output terminal OUT and a connection point of the inductor L2 and the switching transistor M2. Further, between the output terminal OUT and the ground voltage terminal GND, a series circuit including the resistors R3 and R4 is connected in parallel with the capacitor C2. The resistors R3 and R4 generate the divided voltage Vd by dividing the output voltage Vout, and output the divided voltage Vd to an inverting input terminal of the comparator CMP2. The D/A converter DAC2 generates a reference voltage Vref having a voltage value according to the digital code input from the DAC control circuit 12, and outputs the reference voltage Vref to a noninverting input terminal of the comparator CMP2. A load 10 is connected between the output terminal OUT and the ground voltage terminal GND.

The step-up switching regulator 300 of FIG. 5 thus configured and the step-down switching regulator 200 of FIG. 3 are different in the position of the switching transistor, the inductor, and the diode. When the output voltage Vout is increased in the switching regulator 300 of FIG. 5, the impedance between the input terminal IN and the output terminal OUT becomes extremely low, since the inductor L2 and the diode D2 are connected in a direction allowing current to pass, i.e., a forward-biased direction. Accordingly, a relatively large overshoot voltage similar to the overshoot voltage indicated in the time chart of FIG. 4A is generated, as in the case of the step-down switching regulator 200 of FIG. 3. On the other hand, when the output voltage Vout is decreased in the switching regulator 300 of FIG. 5, the switching transistor M2 is in an OFF state, and the diode D2 is connected in the reverse-biased direction. Therefore, the impedance of the switching regulator 300 becomes extremely high. As a result, the output voltage Vout is decreased at a relatively low speed, as in the case of the step-down switching regulator 200 of FIG. 3.

Accordingly, to increase the output voltage Vout in the switching regulator 300 of FIG. 5, the DAC control circuit 302 changes a digital code in a phased manner and outputs the digital code to the D/A converter DAC2 so that the reference voltage Vref output from the D/A converter DAC2 is increased in the phased manner. On the other hand, to decrease the output voltage Vout in the switching regulator 300 of FIG. 5, the DAC control circuit 302 changes and outputs the digital code to the D/A converter DAC2 so that the reference voltage Vref output from the D/A converter DAC2 is decreased to a desired value.

In the waveform pattern of FIG. 4B, the value by which the reference voltage Vref is increased in one phase and the time during which the reference voltage Vref is increased in one phase are kept constant. This waveform pattern is one example, and thus the present invention is not limited to this example. In other words, according to the present invention, the reference voltage Vref is increased in the phased manner to increase the output voltage Vout in the phased manner, with each of the value by which the reference voltage Vref is increased in one phase and the time during which the reference voltage Vref is increased in one phase not necessarily set to a constant value.

As described above, in the switching regulators according to the embodiments of the present invention, the digital code is changed in the phased manner and output to the D/A converter so that the reference voltage Vref output from the D/A converter is increased in the phased manner to increase the output voltage Vout in the phased manner, and that the reference voltage Vref output from the D/A converter is decreased to a desired value to decrease the output voltage Vout. Accordingly, the present invention is capable of effectively eliminating an excessively large overshoot voltage and a resultant excessively large amount of output current occurring when the output voltage is increased.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. 2003-403184 filed on Dec. 2, 2003 in the Japan Patent Office, the entire contents of which are incorporated by reference herein.

What is claimed is:

1. A power supply apparatus, comprising:
a switching transistor configured to perform a switching operation for converting an input source voltage to an output power voltage according to a control signal;
a transistor control circuit configured to generate said control signal based on a reference voltage and a feedback voltage proportional to said output power voltage; and
a reference voltage generator configured to generate said reference voltage, to increase said reference voltage in a phased manner to increase said output power voltage in a phased manner to a desired value, and to decrease said reference voltage to decrease said output power voltage,
wherein said reference voltage generator increases said reference voltage from a first voltage to a second voltage in a phased manner, and in each phase of the voltage increase between said first and second voltages, said reference voltage is held in the phase at a corresponding intermediate voltage which is greater than said first voltage and less than said second voltage, and wherein after said output power voltage reaches said desired value, said reference voltage generator decreases said reference voltage from said second voltage to said first voltage in a single step.

2. A power supply apparatus, comprising:

an input terminal configured to receive an input source voltage;

an output terminal configured to output an output power voltage;

an inductor provided between said input terminal and said output terminal and configured to store energy of said input source voltage and discharge said energy to generate said output power voltage;

a switching transistor provided between said input terminal and said inductor and configured to control outputting of said input source voltage to said inductor by performing a switching operation according to a control signal input in the switching transistor;

an output power voltage detection circuit configured to detect said output power voltage to generate a feedback voltage proportional to said detected output power voltage;

a switching control circuit configured to control switching of said switching transistor to desirably change said output power voltage by comparing said feedback voltage with a predetermined reference voltage; and a reference voltage generation circuit configured to generate and output said reference voltage, to increase said reference voltage in a phased manner to increase said output power voltage in a phased manner to a desired value, and to decrease said reference voltage to decrease said output power voltage, wherein said reference voltage generation circuit increases said reference voltage in said phased manner from a first voltage to an intermediate voltage and then to another voltage, in a step-up fashion, and wherein after said output power voltage reaches said desired value, said reference voltage generation circuit decreases said reference voltage from said another voltage to said first voltage in a single step.

3. The power supply apparatus as described in claim 2, wherein said reference voltage generation circuit comprises;

a D/A converter configured to convert digital data into said predetermined reference voltage; and a DAC control circuit configured to output said digital data to said D/A converter to control said predetermined reference voltage to be output from said D/A converter, to change said digital data in a phased manner to increase said reference voltage in a phased manner to a desired value, and to change said digital data to decrease said reference voltage.

4. The power supply apparatus as described in claim 3, wherein said DAC control circuit has a conversion resolution that changes said reference voltage in a phased manner.

5. The power supply apparatus as described in claim 4, wherein said DAC control circuit changes said digital data bit-by-bit on a binary basis within said conversion resolution to increase said reference voltage in a phased manner.

6. The power supply apparatus as described in claim 2, wherein said power supply apparatus uses a non-isolated switching system.

7. A power supply apparatus, comprising:

switching means for performing a switching operation for converting an input source voltage to an output power voltage according to a control signal;

control means for generating said control signal based on a reference voltage and a feedback voltage proportional to said output power voltage; and reference voltage generation means for generating said reference voltage, increasing said reference voltage in a phased manner to increase said output power voltage in a phased manner to a desired value, and decreasing said reference voltage to decrease said output power voltage, wherein said reference voltage generation means increases said reference voltage increases in said phased manner from a first voltage to an intermediate voltage and then to another voltage, in a step-up fashion, and wherein after said output power voltage reaches said desired value, said reference voltage generation means decreases said reference voltage from said another voltage to said first voltage in a single step.

8. A power supply apparatus, comprising:

an input terminal configured to receive an input source voltage;

an output terminal configured to output an output power voltage;

an inductor provided between said input terminal and said output terminal and configured to store energy of said input source voltage and discharge said energy to generate said output power voltage;

switching means for controlling outputting of said input source voltage to said inductor by performing a switching operation according to a control signal;

output power voltage detection means for detecting said output power voltage to generate a feedback voltage proportional to said detected output power voltage;

switching control means for controlling switching of said switching means to desirably change said output power voltage by comparing said feedback voltage with a predetermined reference voltage; and reference voltage generation means for generating and outputting said reference voltage, increasing said reference voltage in a phased manner to increase said output power voltage in a phased manner to a desired value, and decreasing said reference voltage to decrease said output power voltage, wherein said reference voltage generation means increases said reference voltage from a first voltage to a second voltage in a phased manner, and in each phase of the voltage increase between said first and second voltages, said reference voltage is held in the phase at an intermediate voltage which is greater than said first voltage and less than said second voltage, and wherein after said output power voltage reaches said desired value, said reference voltage generation means decreases said reference voltage from said second voltage to said first voltage in a single step.

9. The power supply apparatus as described in claim 8, wherein said reference voltage generation means comprises:

converting means for converting digital data into said predetermined reference voltage; and conversion control means for outputting said digital data to said converting means to control said predetermined reference voltage to be output from said converting means, changing said digital data in a phased manner to increase said reference voltage in a phased manner to a desired value, and changing said digital data to decrease said reference voltage.

10. The power supply apparatus as described in claim 9, wherein said conversion control means has a conversion resolution that changes said reference voltage in a phased manner.

11. The power supply apparatus as described in claim 10, wherein said conversion control means changes said digital data bit-by-bit on a binary basis within said conversion resolution to increase said reference voltage in a phased manner.

12. The power supply apparatus as described in claim 8, wherein said power supply apparatus uses a non-isolated switching system.

13. A power supply method, comprising:
applying an input source voltage;
providing an output terminal configured to output an output power voltage;
generating a reference voltage;
producing a control signal based on said reference voltage and a feedback voltage proportional to said output power voltage;
performing a switching operation for converting an input source voltage to said output power voltage according to said control signal;
increasing said reference voltage in a phased manner to increase said output power voltage in a phased manner to a desired value,
wherein said reference voltage is increased in said phased manner from a first voltage to a second voltage, and is held, in each phase of the voltage increase between said first and second voltages, at an intermediate voltage which is greater than said first voltage and less than said second voltage; and
after said output power voltage reaches said desired value, decreasing said reference voltage from said second voltage to said first voltage in a single step to decrease said output power voltage.

14. A power supply method, comprising:
providing a switching transistor between an input terminal and an inductor, said input terminal receiving an input source voltage, and said inductor having one end connected to an output terminal for outputting an output power voltage to a load;
detecting said output power voltage to produce a feedback voltage proportional to said detected output power voltage;
generating a predetermined reference voltage;
comparing said feedback voltage with said predetermined reference voltage to output a control signal to said switching transistor;
performing a switching operation of said switching transistor by using said control signal;
repeating an operation of storing energy of said input source voltage in said inductor and discharging said energy from said inductor to generate said output power voltage to be output;
increasing said reference voltage in a phased manner to increase said output power voltage in a phased manner to a desired value; and
decreasing said reference voltage to decrease said output power voltage,
wherein said reference voltage is increased from a first voltage to a second voltage in a phased manner, and in each phase of the voltage increase between said first and second voltages, said reference voltage is held in the phase at an intermediate voltage which is greater than said first voltage and less than said second voltage, and
wherein after said output power voltage reaches said desired value, said reference voltage is decreased from said second voltage to said first voltage in a single step.

15. The power supply method as described in claim 14, wherein said generating step comprises:
outputting digital data; and
converting said digital data to said predetermined reference voltage,
wherein said outputting step changes said digital data in a phased manner to increase said reference voltage in a phased manner to a desired value, and changes said digital data to decrease said reference voltage.

16. The power supply method as described in claim 15, wherein said outputting step has a conversion resolution that changes said reference voltage in a phased manner.

17. The power supply method as described in claim 16, wherein said outputting step changes said digital data bit-by-bit on a binary basis within said conversion resolution to increase said reference voltage in a phased manner.

18. The power supply method as described in claim 14, wherein the power supply method uses a non-isolated switching system.

19. The power supply apparatus of claim 1, wherein said feedback voltage is a divided voltage of said output power voltage, said divided voltage being less than said output power voltage.

* * * * *